Figure 1:
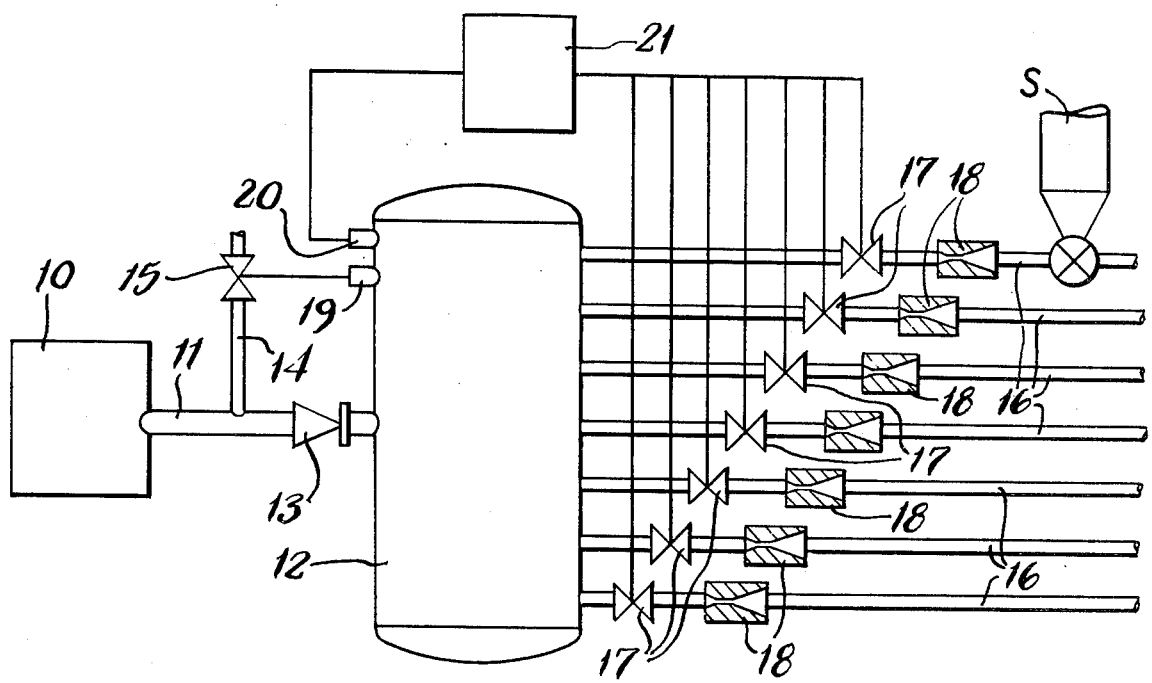

United States Patent [19]

Clancy et al.

[11] 4,014,577
[45] Mar. 29, 1977

[54] PNEUMATIC CONVEYING SYSTEMS

[75] Inventors: James Roger Clancy; Kenneth Cook, both of Stockport, England

[73] Assignee: Henry Simon Limited, Cheshire, England

[22] Filed: Mar. 1, 1976

[21] Appl. No.: 662,867

Related U.S. Application Data

[63] Continuation-in-part of Ser. No. 489,470, July 15, 1974, abandoned, which is a continuation-in-part of Ser. No. 311,242, Dec. 1, 1972, abandoned.

[52] U.S. Cl. ............................... 302/35; 137/118; 302/17
[51] Int. Cl.² ........................................ B65G 53/66
[58] Field of Search ............... 302/17, 27, 28, 35, 302/42, 53, 64; 137/118, 119

[56] References Cited

UNITED STATES PATENTS

| | | | |
|---|---|---|---|
| 2,868,590 | 1/1959 | Allen et al. | 302/17 |
| 2,957,727 | 10/1960 | Allen et al. | 302/17 |
| 3,365,242 | 1/1968 | Marchetti | 302/35 |

Primary Examiner—Johnny D. Cherry
Assistant Examiner—Jeffrey V. Nase
Attorney, Agent, or Firm—Norris & Bateman

[57] ABSTRACT

A pneumatic conveying system has a compressor of known capacity connected to a compressed air storage tank having a plurality of valve output lines which if all open at the same time would reduce the air pressure available to each line below a required amount. Hoppers are provided for supplying to said lines, material to be conveyed and a control is provided for selectively opening and closing the valves and ensuring that not more than a certain air volume demand is placed on the storage tank by a number of lines in operation at the same time. Each conveying line contains a restriction adapted to maintain substantially constant mass flow rate of air therein leaving the storage tank.

7 Claims, 2 Drawing Figures

PNEUMATIC CONVEYING SYSTEMS

This is a continuation-in-part of Ser. No. 489,470 filed July 15, 1974, now abandoned, which is a continuation-in-part of Ser. No. 311,242, filed Dec. 1, 1972, now abandoned.

This invention relates to a pneumatic conveying system of the kind wherein a plurality of conveying lines are supplied from a compressed air storage tank fed by a compressor, for conveying materials to, for example, a mixing station, and wherein said lines are separately and selectively connected and disconnected with said tank by means of a plurality of valves each operatively connected to one of said lines and operable manually or controlled automatically in accordance with a predetermined programme.

According to the present invention there is provided a pneumatic conveying system comprising a compressed air storage tank, a compressor of predetermined output capacity connected to deliver compressed air to said tank, a plurality of separate output conveying lines connected to said tank, means for supplying to each of said lines materials to be conveyed, an air nozzle in each line having convergent and divergent wall forms upstream and downstream respectively of a nozzle throat for maintaining substantially constant mass flow rate of air through said nozzle, a valve in each said line connecting same to said tank, and control means for selectively opening and closing each of said valves, the lines being sufficient in number that if all of said valves were open at the same time, the pressure required to meet the collective air volume demand thereof would be greater than can be provided by said compressor, further means being provided for sensing a condition when a plurality of said lines are operating such that introduction of a further line could cause the capacity of said compressor to be exceeded, and for transmitting a signal accordingly to said control means to prevent the valves in further of said lines from being opened until at least one of said operative lines becomes inoperative.

The invention will become further apparent from the following description with reference to the accompanying drawings which illustrate schematically by way of example only, one form of pneumatic conveying system incorporating the invention.

Figure 2:
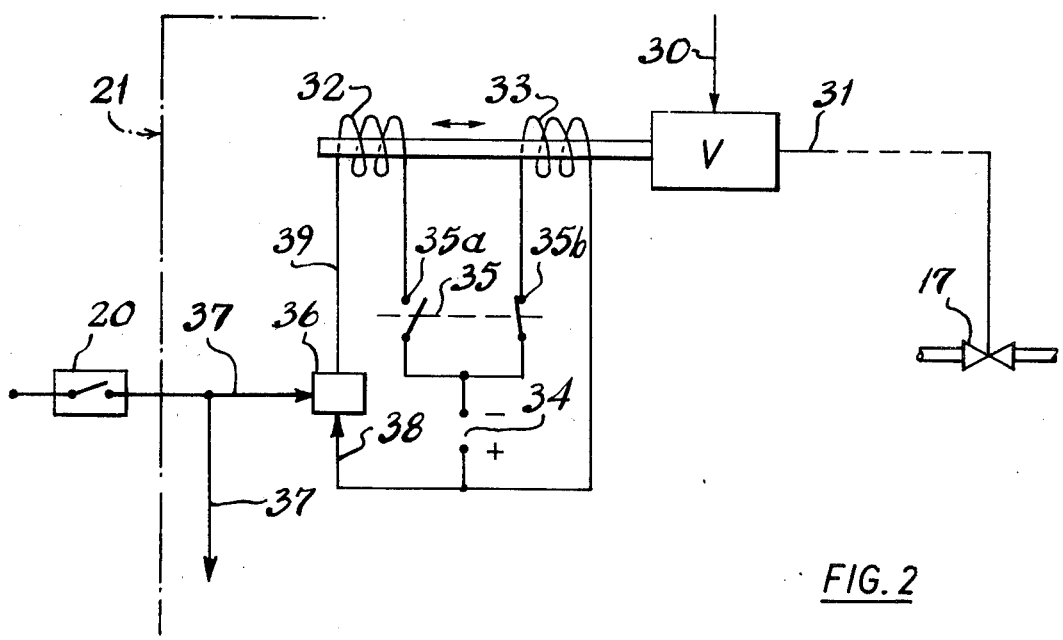

Of the drawings:

FIG. 1 illustrates particularly the arrangement of a compressed air supply for the system;

and FIG. 2 shows means for controlling the operation of one conveying line.

With reference to the drawings, there is provided a rotary piston compressor 10 connected via a line 11 to a compressed air storage tank 12. A one way valve 13 is included in the line 11 upstream of which is a branch line 14 having a valve 15 therein. The branch line 14 can be vented to atmosphere by opening the valve 15.

A plurality of conveying lines 16 (in this example seven in number) are connected to the output side of the storage tank 12, and each line 16 includes a valve 17 for operatively connecting the line with the tank 12. Materials to be conveyed are introduced into said lines 16 directly or indirectly from individual storage bins or hoppers S, only one of which is shown in FIG. 1.

Upstream of the hopper S in each line an air nozzle 18 is provided and at its inlet or upstream side, has an internal wall form which converges rapidly to a nozzle throat having a cross sectional area so related to the desired mass flow rate through the nozzle that in operation the air velocity through the throat is approximately equal to the velocity of sound in the air at the temperature and pressure existing at the throat. The nozzle has a diverging wall form from its throat at a smaller angle. Such a device ensures a substantially constant mass flow rate through the nozzle notwithstanding variations in resistances or changes of conditions in the line downstream of the nozzle. The mass flow rate through each nozzle can be rendered adjustable by the provision of a concentric needle which is movable axially thus to vary the cross section of the throat.

The storage tank 12 is provided with a first pressure sensing switch device 19 which is operably connected to a solenoid or like operator for valve 15 and which, when the system is operating, continuously senses the pressure in the tank 12 and maintains said pressure at a constant value by causing the valve 15 to open and close when necessary.

It will be understood that in a system of the kind described, the number of conveying lines 16 to be operated simultaneously is selective and that at no time is it intended that all conveying lines should be in operation at once. Thus the working capacity of the compressor 10 is sufficient to feed, say, four of the conveying lines at the required pressure in each. It can be seen, therefore, that if a fifth line were to be put into operation, the capacity of the compressor to provide sufficient pressure in the tank 12 would be exceeded and the pressure of air in the tank would be reduced to a level at which the other four conveying lines would be partially starved.

Thus, a second pressure sensing switch device 20 is provided and adapted continuously to sense the pressure in the storage tank 12. If, as in this example, the maximum number of lines to be operated simultaneously is four and all lines operate at the same air velocity, then the device 20 will sense a low pressure limit when a fourth line is brought into operation. The device 20 is connected to a control panel 21 which includes control means to prevent opening of the valves 17 as will be described. Thus, when the device 20 senses that four lines are operating, a signal is transmitted to the panel 21 to prevent any further lines being brought into operation by an operator.

The control panel 21 comprises, for each conveying line, a control member including a solenoid operated double-acting valve V adapted selectively to complete or interrupt a supply of control air from a line 30 via a line 31 to the appropriate valve 17. Thus each valve 17 is pneumatically actuated and the condition of the valve V associated therewith determines whether the valve is open or closed. The valve V is shown schematically to be opened and closed by a pair of coils 32, 33 respectively, which when energised move the valve stem in one or other direction. The coils are energised by a power supply 34 and a double-acting selector switch 35 the latter being so arranged that the coils 32 and 33 cannot be energized together.

Completing the circuit from the power supply 34 to the coil 32 is a member 36 known as an AND logic module. The module 36 is so constructed that to energise the output line 39 thereof it is necessary for a voltage to appear on both of the input lines 37 and 38 thereof.

Connected to the input line 37, and indeed to that of each of the remaining circuits in the control panel 21 feeding the other conveying lines, is the switch device 20.

In this example the signal transmitted by the switch 20 when the pressure in the tank 12 reduces, is represented by the opening of the switch 20, and thus the loss of voltage on lines 37.

In the operation of the system, so long as the switch 20 remains closed denoting sufficient pressure in the tank 12, then when each selector switch 35, representing a valve 17, is actuated to close the contacts 35a, the associated coil 32 is energised to cause the valve 17 to open. As the valve V is double-acting, this condition will remain until the switch 35 is actuated in the opposite direction to close contacts 35b thus energising the coil 33 to actuate the valve V in the opposite sense, thus to close the associated valve 17.

When, in this example, four conveying lines are in operation, the pressure in the tank 12 is reduced to a level at which the switch 20 is opened. Thus, the voltage on the lines 37 to the modules 36 is discontinued such that it becomes impossible to energise the coil 32 associated with any further conveying line. When the pressure in the tank 12 builds up as a result of one of the operative lines becoming inoperative, then the switch 20 becomes closed and the voltage on the lines 37 is re-established.

If necessary means can be included in the control panel 21 to ensure that should an operator actuate the switches 35 to open fourth and fifth lines within an interval of time too short for the pressure in the tank to be sufficiently reduced to have actuated the switch 20, then there will be a delay between the responses of the consecutively energised modules 36 to prevent more than the requisite number of lines being brought into operation.

The operation of the valves 17 to feed the lines 16 can be selected on the control panel manually or automatically in accordance with a predetermined programme. In any event, the device 20 will ensure that the system cannot be overloaded by selecting too many lines. In the case of manual control, the panel 21 can be so arranged that should an operator select a fifth conveying line, then that line will be brought into operation only after one of the lines already operating has been relieved.

The system can include any number of conveying lines each adapted to convey a different material, and the maximum working capacity of the compressor will be chosen in accordance with the maximum number of lines intended for use simultaneously. In an alternative arrangement, the operating flow rate of air in the conveying lines may be selected individually in accordance with the material to be conveyed therein. Where the flow rates are different it is necessary to ensure that the difference between the pressure in the tank at which the switch 20 is actuated and that at which the conveying lines may become starved is greater than the pressure drop which would be experienced in the tank should the bin to be operated at maximum flow rate be selected. In this way it will be seen that if, for example, four low flow rate lines are operating it is possible that the switch 20 will not be actuated until after a fifth line has been introduced at which point the pressure in the tank has reduced to a level whereat it would be impossible to accommodate a further line in the event that the latter has to operate at the aforesaid maximum flow rate.

The use of a rotary piston compressor is convenient and less expensive than, for example, a reciprocating-type compressor which could, however, be used in the system if required, the vent line 14 and valve 15 then being replaced by a valve, controlling the intake of air at the compressor.

The means for sensing the pressure available at the tank may comprise an arrangement adapted to monitor the total mass flow rates of air passing through the lines in operation, and would thus sense a condition when operation of any further conveying lines would cause the operating capacity of the system to be exceeded.

What is claimed is:

1. A pneumatic conveying system comprising a compressed air storage tank, a compressor of predetermined output capacity connected to deliver compressed air to said tank, a plurality of separate output conveying lines connected to said tank, means for supplying to each of said lines materials to be conveyed, an air nozzle in each line having convergent and divergent wall forms upstream and downstream respectively of a nozzle throat for maintaining substantially constant mass flow rate of air through said nozzle, a valve in each said line connecting same to said tank, and control means for selectively opening and closing each of said valves, the lines being sufficient in number that if all of said valves were open at the same time, the pressure required to meet the collective air volume demand thereof would be greater than can be provided by said compressor, further means being provided for sensing a condition when a plurality of said lines are operating such that introduction of a further line could cause the capacity of said compressor to be exceeded, and for transmitting a signal accordingly to said control means to prevent the valves in further of said lines from being opened until at least one of said operative lines becomes inoperative.

2. A pneumatic conveying system according to claim 1, wherein said compressor is a rotary piston compressor.

3. A pneumatic conveying system according to claim 2, wherein said compressor has vent means between the output thereof and the input of said storage tank and a pressure sensitive device being in communication with the interior of said tank and connected to said vent means, for sensing the pressure in said tank and maintaining same at a constant level by causing said vent means to open and close when necessary.

4. A pneumatic conveying system according to claim 1, wherein said further means for sensing said condition comprises a low pressure sensing device in communication with the interior of said tank and connected to said control means.

5. A pneumatic conveying system according to claim 1, wherein the throat of each said nozzle has a cross sectional area so related to the desired mass flow rate through the nozzle that in operation the air velocity through the throat is approximately equal to the velocity of sound in the air at the temperature and pressure existing at the throat.

6. A pneumatic conveying system according to claim 1, wherein said control means comprises a plurality of control systems, one for each of said conveying line valves, each system comprising a double-acting solenoid-operated control valve having a switch for selectively opening and closing said control valve and thus the associated conveying line valve, and means for permitting operation of said control valve to open said conveying line valve only upon recognition from said sensing means that the pressure in said tank is sufficient for operation of further conveying lines, and means associated with each control valve to ensure that the associated conveying line valve, when open, remains open until closed by actuation of said switch.

7. A pneumatic conveying system according to claim 6 wherein each said control valve is actuated by a pair of coils, one for each direction of operation of said control valve and energised selectively via said switch, the latter being a double-acting switch such that said coils cannot be energised together.

* * * * *